(12) United States Patent
Shouji et al.

(10) Patent No.: US 12,500,283 B2
(45) Date of Patent: Dec. 16, 2025

(54) METHOD FOR TREATING ALLOY

(71) Applicant: SUMITOMO METAL MINING CO., LTD., Tokyo (JP)

(72) Inventors: Hirofumi Shouji, Niihama (JP); Hiroshi Takenouchi, Niihama (JP); Itsumi Matsuoka, Niihama (JP); Shota Sanjo, Niihama (JP); Takumi Matsugi, Niihama (JP); Satoshi Asano, Niihama (JP); Shin-ichi Heguri, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 18/580,203

(22) PCT Filed: Jul. 14, 2022

(86) PCT No.: PCT/JP2022/027748
§ 371 (c)(1),
(2) Date: Jan. 18, 2024

(87) PCT Pub. No.: WO2023/002917
PCT Pub. Date: Jan. 26, 2023

(65) Prior Publication Data
US 2024/0266627 A1 Aug. 8, 2024

(30) Foreign Application Priority Data
Jul. 20, 2021 (JP) .................. 2021-119297
Aug. 31, 2021 (JP) .................. 2021-140726

(51) Int. Cl.
*H01M 10/54* (2006.01)
*C22B 3/00* (2006.01)
(Continued)

(52) U.S. Cl.
CPC .............. *H01M 10/54* (2013.01); *C22B 5/00* (2013.01); *C22B 7/007* (2013.01); *C22B 15/0008* (2013.01); *C22B 23/0415* (2013.01)

(58) Field of Classification Search
CPC ....... C22B 5/00; C22B 7/007; C22B 15/0008; C22B 23/0415; C22B 3/06; C22B 3/22;
(Continued)

(56) References Cited

U.S. PATENT DOCUMENTS

| 3,975,189 A | * | 8/1976 | Haugen ................ C01G 53/00 423/40 |
| 4,093,526 A | | 6/1978 | Blanco et al. |

(Continued)

FOREIGN PATENT DOCUMENTS

| CA | 2796844 A1 | 12/2011 |
| CN | 101050487 A | 10/2007 |

(Continued)

OTHER PUBLICATIONS

WO2018192121 A1 (Year: 2018).*
(Continued)

*Primary Examiner* — Sally A Merkling
*Assistant Examiner* — Danielle M. Carda
(74) *Attorney, Agent, or Firm* — Troutman Pepper Locke LLP; James E. Armstrong, IV; Nicholas J. DiCeglie, Jr.

(57) ABSTRACT

Provided is a method for obtaining a solution having a high concentration of nickel and/or cobalt from an alloy that contains copper as well as nickel and/or cobalt, in a waste lithium-ion battery. A method for treating an alloy comprises: a leaching step S1 for subjecting an alloy that contains copper as well as nickel and/or cobalt to a leaching treatment by using an acid solution in the presence of a sulfiding agent to obtain a leachate and a leaching residue; and a reduction step S2 for adding a reducing agent to a part of the obtained leachate and performing a reduction treatment to obtain a post-reduction solution and a reduction residue, wherein in the leaching step S1, the leachate that has not been provided in the reduction treatment in the reduction step S2, is repeatedly used as part or all of the acid solution added in the leaching treatment.

6 Claims, 2 Drawing Sheets

(51) Int. Cl.
*C22B 5/00* (2006.01)
*C22B 7/00* (2006.01)
*C22B 15/00* (2006.01)

(58) Field of Classification Search
CPC .. C22B 3/04; C22B 3/44; C22B 15/00; C22B 23/00; C22B 23/0407; C22B 23/043; C22B 23/0453; C22B 23/0461; C22B 26/12; C22B 7/00; Y02P 10/20; Y02W 30/84
USPC .......................................................... 75/740
See application file for complete search history.

(56) References Cited

U.S. PATENT DOCUMENTS

| | | | |
|---|---|---|---|
| 4,828,809 | A | 5/1989 | Thomassen et al. |
| 5,858,061 | A | 1/1999 | Kleinsorgen et al. |
| 6,440,194 | B1 | 8/2002 | Krofchak et al. |
| 6,699,302 | B1 | 3/2004 | Jones et al. |
| 7,169,206 | B2 | 1/2007 | Cheret et al. |
| 2003/0066389 | A1 | 4/2003 | Kudo et al. |
| 2003/0173308 | A1 | 9/2003 | Kobayashi et al. |
| 2009/0241736 | A1 | 10/2009 | Abe et al. |
| 2013/0112043 | A1 | 5/2013 | Kikuta et al. |
| 2013/0269484 | A1 | 10/2013 | Ishida et al. |
| 2014/0174256 | A1 | 6/2014 | Takahashi et al. |
| 2014/0318313 | A1 | 10/2014 | Takahashi et al. |
| 2015/0368755 | A1 | 12/2015 | Nakon |
| 2017/0240994 | A1 | 8/2017 | Shoji et al. |
| 2018/0087127 | A1 | 3/2018 | Adachi et al. |
| 2019/0152797 | A1 | 5/2019 | Liu et al. |
| 2020/0044295 | A1 | 2/2020 | Arakawa et al. |
| 2020/0216327 | A1 | 7/2020 | Higaki et al. |
| 2020/0216929 | A1* | 7/2020 | Higaki ................ C22B 15/0056 |
| 2020/0232066 | A1 | 7/2020 | Higaki et al. |
| 2021/0126300 | A1 | 4/2021 | Togashi et al. |
| 2021/0130926 | A1 | 5/2021 | Lee et al. |
| 2021/0180154 | A1 | 6/2021 | Takenouchi et al. |
| 2023/0071697 | A1 | 3/2023 | Takenouchi et al. |
| 2023/0167526 | A1 | 6/2023 | Kudou et al. |

FOREIGN PATENT DOCUMENTS

| | | | | |
|---|---|---|---|---|
| CN | 102923795 | A | 2/2013 | |
| CN | 105063349 | A | 11/2015 | |
| CN | 105567978 | A | 5/2016 | |
| CN | 106558739 | A | 4/2017 | |
| CN | 109763001 | A | 5/2019 | |
| CN | 109897967 | A | 6/2019 | |
| CN | 110468281 | A | 11/2019 | |
| CN | 110512080 | A | 11/2019 | |
| CN | 111807388 | A | 10/2020 | |
| EP | 0248518 | A1 | 12/1987 | |
| EP | 3690068 | A1 | 8/2020 | |
| EP | 3702481 | A1 | 9/2020 | |
| EP | 3702482 | A1 | 9/2020 | |
| EP | 3822000 | A1 * | 5/2021 | ............... B09B 3/40 |
| JP | S46-018847 | B1 | 5/1971 | |
| JP | S63-259033 | A | 10/1988 | |
| JP | 2007-191769 | A | 8/2007 | |
| JP | 2010-174366 | A | 8/2010 | |
| JP | 2012-001750 | A | 1/2012 | |
| JP | 2012-172169 | A | 9/2012 | |
| JP | 2013-194269 | A | 9/2013 | |
| JP | 2015-183292 | A | 10/2015 | |
| JP | 2016-040406 | A | 3/2016 | |
| JP | 2016-191119 | A | 11/2016 | |
| JP | 2016-191134 | A | 11/2016 | |
| JP | 2019-065346 | A | 4/2019 | |
| JP | 2019-077912 | A | 5/2019 | |
| JP | 2019-077913 | A | 5/2019 | |
| JP | 2019-081915 | A | 5/2019 | |
| JP | 2019-094556 | A | 6/2019 | |
| JP | 2019-108586 | A | 7/2019 | |
| JP | 2019-530795 | A | 10/2019 | |
| JP | 2021-147686 | A | 9/2021 | |
| KR | 2018-0074569 | A | 7/2018 | |
| KR | 10-2020-0087239 | A | 7/2020 | |
| WO | 2018/181816 | A1 | 10/2018 | |
| WO | WO-2018192121 | A1 * | 10/2018 | ............. C22B 7/006 |
| WO | 2019/064996 | A1 | 4/2019 | |
| WO | 2019/082533 | A1 | 5/2019 | |
| WO | 2019/121086 | A1 | 6/2019 | |
| WO | 2019/124015 | A1 | 6/2019 | |
| WO | 2020/013293 | A1 | 1/2020 | |
| WO | 2021/166755 | A1 | 8/2021 | |

OTHER PUBLICATIONS

Office Action mailed May 14, 2024, issued in the KR Patent Application No. KR10-2024-7004015 and English translation thereof.
Office Action mailed Jun. 6, 2024, issued in the CN Patent Application No. CN202280050404.4 and English translation thereof.
Extended European Search Report issued Nov. 29, 2024 in the EP Patent Application No. 22845851.9.
Office Action issued Jan. 2, 2024 in the CN Patent Application No. 202180012962.7 with machine translaton.
Extended European Search Report issued Apr. 5, 2024 in the EP Patent Application No. 21756208.1.
Office Action issued Jul. 15, 2014 in the KR Patent Application No. 10-2022-7028012 with translation.
Office Action issued Oct. 13, 2024 in the CN Patent Application No. 20180012962.7 with translation.
H.Y. Sohn. "Hydrometallurgical Principals" in Encyclopedia of Materials Sci and Tech., vol. 1-11, Buschow et al. eds. (2001). Elsevier. Retrieved on Jun. 3, 2025. Retrieved from the Internet: <URL: https://app.knovel.com/hotlink/pdf/id:kt00B7A3DQ/encyclopedia-materials/hydrometallurgical-principles> (Year: 2001).
Office Action issued Apr. 17, 2025 in thh KR Patent Application No. 10-2022-7028012 with translation.
Extended European Search Report issued Apr. 1, 2025 in the EP Patent Application No. 22845846.9.
Office Action issued Apr. 15, 2025 in the CA Patent Application No. 3233494.
Office Action issued April 30, 2025 in the CA Patent Application No. 3240181.
Office Action issued Jun. 11, 2025 in U.S. Appl. No. 17/797,212.
"Table 17.1: Selected Standard Reduction Potentials at 25°C", Chemistry 2e, OpenStax, Rice University, 2019. pp. 826-828. (Year: 2019).
Office Action issued Jul. 10, 2025 in the U.S. Appl. No. 18/579,520.
Extended European Search Report issued Sep. 16, 2025 in the EP Patent Application No. 22867198.8.
Office Action issued Sep. 23, 2025 in the U.S. Appl. No. 18/716,530.

* cited by examiner

METHOD FOR TREATING ALLOY

TECHNICAL FIELD

The present invention relates to an alloy processing method for producing a nickel- and/or cobalt-containing solution from an alloy including nickel and/or cobalt and copper.

BACKGROUND ART

Lithium ion batteries (hereinafter also referred to as "LIBs"), which have lightweight and high power characteristics, are installed in vehicles, such as electric vehicles and hybrid vehicles, and in electronic devices, such as cell phones, smart phones, and personal computers.

An LIB has a structure including: a positive electrode material including an aluminum foil positive electrode current collector and a positive electrode active material, such as lithium nickelate or lithium cobaltate, bonded to the surface of the positive electrode current collector; a negative electrode material including a copper foil negative current collector and a negative electrode active material, such as graphite, bonded to the surface of the negative electrode current collector; a separator made of a porous resin film, such as a porous polypropylene film; an electrolytic solution including a solution of an electrolyte, such as lithium hexafluorophosphate ($LiPF_6$), in an organic solvent; and an outer case made of a metal, such as aluminum or iron, or a plastic, such as polyvinyl chloride, in which the positive and negative electrode materials and the separator impregnated with the electrolytic solution are housed.

After operating for a certain period in vehicles or electronic devices as mentioned above, LIBs will no longer be able to operate due to the degradation of the vehicles or electronic devices or the end of their lifetime, which will result in discarded lithium ion batteries (discarded LIBs). Discarded LIBs also include defective products occurring in the original LIB manufacturing process.

These discarded LIBs contain valuable components, such as nickel, cobalt, and copper, which are desired to be recovered and reused for economical use of resources.

In the conventional art, a common process widely used to efficiently recover valuable components from devices, parts, or other materials including metals includes a pyrometallurgical process that is based on the principle of pyrometallurgy and includes introducing the materials into a furnace for melting at high temperature; and separating a metallic material including the valuable components from other materials in the form of slag. For example, Patent Document 1 discloses a method of recovering valuable metals using a pyrometallurgical process. The method disclosed in Patent Document 1 can be used for recovering valuable metals from discarded LIBs so that copper alloys containing nickel and cobalt can be obtained.

Such a pyrometallurgical process (hereinafter also referred to as "dry process") advantageously enables a variety of impurities to be separated at a time, although it is disadvantageously energy-consuming since it uses a furnace for heating at high temperature. Such a pyrometallurgical process is also advantageous in that the resulting slag is chemically stable, less likely to have an impact on the environment, and easy to deal with.

Unfortunately, such a pyrometallurgical process has a problem in that when it is used for treating discarded LIBs, some of the valuable components (in particular, cobalt) are almost entirely distributed into the slag, which means an unavoidable loss in cobalt recovery. Moreover, the metallic material resulting from the pyrometallurgical process is an alloy including coexisting valuable components, which needs to be subjected to refining and impurity removal such that the coexisting valuable components can be individually separated from the alloy and reused.

A method usually used for separating elements in the pyrometallurgical process includes gradually cooling a high-temperature molten material to separate, for example, copper and lead or lead and zinc. Unfortunately, when copper and nickel are main components, such as those in discarded LIBs, they will uniformly melt together in all composition ranges, which means that the gradual cooling will convert them into only a mixed layered solid and not allow copper and nickel to be separated from each other.

Another refining method includes allowing nickel to undergo a disproportionation reaction with carbon monoxide (CO) to volatilize and separate the product from copper and cobalt. Unfortunately, such a method has a problem in that the use of the toxic CO gas makes it difficult to ensure safety.

Another method used industrially to separate copper and nickel includes roughly separating a mixture of mattes (sulfides). This method includes performing a smelting process to produce mattes containing copper and nickel; and gradually cooling the mattes in a way similar to that mentioned above, to separate a copper-rich sulfide and a nickel-rich sulfide. Unfortunately, this separation method can only roughly separate copper and nickel and needs an additional process, such as electrolytic refining, when nickel and copper should be obtained at high purity.

Other methods have also been studied that include producing chlorides and separating the chlorides based on their difference in vapor pressure. Unfortunately, such methods involve the process of handling a large amount of toxic chlorine and thus need extensive measures to prevent equipment corrosion and to ensure safety, which is hardly considered suitable for industrial use.

Thus, the pyrometallurgical process for separation and purification of each element has the disadvantage of being limited to a crude separation level or being expensive.

In contrast, the hydrometallurgical process (hereinafter also referred to as "wet process"), which is based on a hydrometallurgical smelting method and includes acid treatment, neutralization, solvent extraction, and other methods, is advantageous in that it is less energy-consuming and able to separate individual valuable components from a mixture and to recover the individual valuable components at a high purity grade.

Unfortunately, when used for the treatment of discarded LIBs, the hydrometallurgical process allows hexafluorophosphate anions (an electrolyte component of discarded LIBs) to mix into an acid solution containing the leached valuable components, since the hexafluorophosphate is a hard-to-treat substance that cannot be completely decomposed even with sulfuric acid at high concentration and high temperature. Hexafluorophosphate anions are a water-soluble carbonate ester, which means that it is difficult to recover phosphorus and fluorine from the aqueous solution obtained after the recovery of the valuable components and that there are many environmental restrictions, such as the need to take a variety of measures to reduce the emission of such substances into public marine areas and other areas.

It is also not easy to efficiently leach valuable components from discarded LIBs using only an acid or to obtain a solution that contains leached valuable components and is ready to be subjected to refining. In particular, the main body of the discarded LIB is resistant to acid leaching, and it is not easy to completely leach the valuable components from the discarded LIB. If a strongly oxidizing acid is used to perform aggressive leaching, not only the valuable components but also impurity components, such as aluminum, iron, and manganese, not intended to be recovered industrially, can be leached, which will cause problems, such as the need to treat the impurities by neutralization and other processes, an additional cost for the neutralizing agent, and an increase in the amount of discharged water or the amount of sediments. Furthermore, discarded LIBs may still have a residual charge. Thus, a time-consuming process for releasing the residual charge is necessary since the risk of heat or explosion may remain if the LIBs are treated without any modification.

Thus, using only the hydrometallurgical process to treat discarded LIBs is not always considered an advantageous way.

Under such circumstances, attempts have been made to treat discarded LIBs, which are difficult to treat completely by the pyrometallurgical or hydrometallurgical process alone, by a combination of pyrometallurgical and hydrometallurgical processes, which specifically includes performing a pyrometallurgical process, including the roasting of the discarded LIBs, to remove impurities as much as possible and to produce a homogeneous processed material from the discarded LIBs; and subjecting the processed material to a hydrometallurgical process to separate valuable components from other components.

In the combination of pyrometallurgical and hydrometallurgical processes, fluorine and phosphorus derived from the electrolytic solution can be volatilized and removed by the pyrometallurgical process, while organic components, such as plastics and separators (structural components of the discarded LIBs), can be decomposed by heat. The processed material produced from the discarded LIBs by the pyrometallurgical process is in a homogeneous state and thus provides a homogeneous starting material easy to handle for the hydrometallurgical process.

Unfortunately, only a simple combination of pyrometallurgical and hydrometallurgical processes still has the problem of recovery loss caused by the distribution of cobalt from the discarded LIBs into the slag.

To address this problem, for example, the treatment conditions for the pyrometallurgical process may be controlled so that reductive melting can be performed in such a way that cobalt is distributed into the metallic material rather than the slag or that the distribution of cobalt into the slag is reduced. Unfortunately, such a method may produce a metallic material in the form of an insoluble, corrosion-resistant, copper-based alloy containing nickel and cobalt. Since such a corrosion-resistant alloy is hardly soluble in an acid, it will be impossible for the hydrometallurgical process to effectively recover valuable components from the corrosion-resistant alloy.

For example, chlorine gas may be used for the leaching of the corrosion-resistant alloy. In such a case, a solution (leachate) can be obtained which contains a high concentration of copper and relatively low concentrations of nickel and cobalt. From such a solution, nickel and cobalt can be easily separated by a known method, such as solvent extraction, but specifically, it is difficult to achieve easy and low-cost separation of copper from nickel and cobalt.

Processes for recovering valuable metals from discarded LIBs have attracted attention as an effective way for the utilization of urban mines and have been actively developed in recent years. Unfortunately, the existing hydrometallurgical processes mentioned above are disadvantageous in that they can only produce low nickel or cobalt content solutions from discarded LIBs-derived alloys and that such solutions require high costs for concentration and refining.

The problem described above can also occur when nickel and/or cobalt and copper are separated from discarded batteries other than discarded LIBs and when nickel and/or cobalt and copper are separated from alloys derived from materials other than discarded batteries. Citation List Patent Document Patent Document 1: Japanese Unexamined Patent Application, Publication No. 2012-172169

DISCLOSURE OF THE INVENTION

Problems to be Solved by the Invention

It is an object of the present invention, which has been made in view of these circumstances, to provide a method for easily producing a solution containing nickel and/or cobalt at a high concentration from an alloy including nickel and/or cobalt and copper, such as that derived from discarded lithium ion batteries.

Means for Solving the Problems

As a result of intensive studies, the inventors have created a process including: performing a leaching treatment with an acid solution in the presence of a sulfurizing agent to obtain a leachate; and recycling at least part of the resulting leachate as an acid solution for the next and subsequent leaching treatments and have completed the present invention based on findings that such a process provides a solution to the problem described above.

(1) A first aspect of the present invention is directed to an alloy processing method including: a leaching step that includes subjecting an alloy including nickel and/or cobalt and copper to a leaching treatment with an acid solution in the presence of a sulfurizing agent to obtain a leachate and a leached residue; and a reduction step that includes subjecting some of the leachate to a reduction treatment by adding a reducing agent to the some of the leachate to obtain a post-reduction solution and a reduced residue, in which the remainder of the leachate, not subjected to the reduction treatment of the reduction step, is recyclably used in the leaching step as a part or the whole of the acid solution added for the leaching treatment.

(2) A second aspect of the present invention is directed to an alloy processing method according to the first aspect, in which the leaching step includes: performing the leaching treatment to obtain a first leached slurry including at least a sulfide of copper and a solution containing nickel and/or cobalt; then further adding the alloy and the sulfurizing agent to the first leached slurry and performing the leaching treatment again on the resulting mixture to obtain a second leached slurry including a leachate and a leached residue; and subjecting the second leached slurry to solid-liquid separation to obtain the leachate, and the reduction step includes subjecting the leachate to the reduction treatment.

(3) A third aspect of the present invention is directed to an alloy processing method according to the first aspect, in which in the leaching step, the acid solution is added in an amount of more than 1 equivalent and 1.2 equivalents or less for the leaching treatment, and the amount of the leachate being recyclably used for the leaching treatment is controlled such that the leaching treatment produces a leachate with a free acid concentration in the range of 0.1 mol/L or more and 0.4 mol/L or less.

(4) A fourth aspect of the present invention is directed to an alloy processing method according to any one of the first to third aspects, further including an oxidation and neutralization step that includes subjecting the reduced solution resulting from the reduction step to an oxidation and neutralization treatment by adding an oxidizing agent and a neutralizing agent to the reduced solution to obtain a post-oxidation-and-neutralization solution and an oxidized and neutralized residue.

(5) A fifth aspect of the present invention is directed to an alloy processing method according to any one of the first to fourth aspects, in which the alloy includes an alloy obtained through melting discarded lithium ion batteries.

Effects of the Invention

The present invention provides a simple process that allows effective production of a solution containing nickel and/or cobalt at a high concentration from an alloy including nickel and/or cobalt and copper, such as that derived from discarded lithium ion batteries.

PREFERRED MODE FOR CARRYING OUT THE INVENTION

Hereinafter, specific embodiments of the present invention (hereinafter referred to as "embodiments") will be described in detail. It should be noted that the embodiments are not intended to limit the present invention and may be appropriately altered or modified for implementation without departing from the gist of the present invention. As used herein, the expression "X to Y", in which X and Y each represent any numerical value, is intended to mean "X or more and Y or less".

An embodiment is directed to an alloy processing method for producing a solution containing nickel and/or cobalt from an alloy including nickel and/or cobalt and copper.

The alloy including nickel and/or cobalt and copper, which is to be processed, may be produced from, for example, waste derived from degraded vehicles or electronic devices, scrap derived from end-of-life lithium ion batteries, or discarded batteries, such as defective products generated in the battery manufacturing process. The alloy may be produced by subjecting such discarded batteries or other materials to a pyrometallurgical process including heating, melting, and reducing the materials.

Hereinafter, the alloy processing method will be described in more detail with reference to examples where an alloy obtained through melting discarded lithium ion batteries (hereinafter also referred to as "discarded LIBs") is subjected to the treatment.

Figure 1:
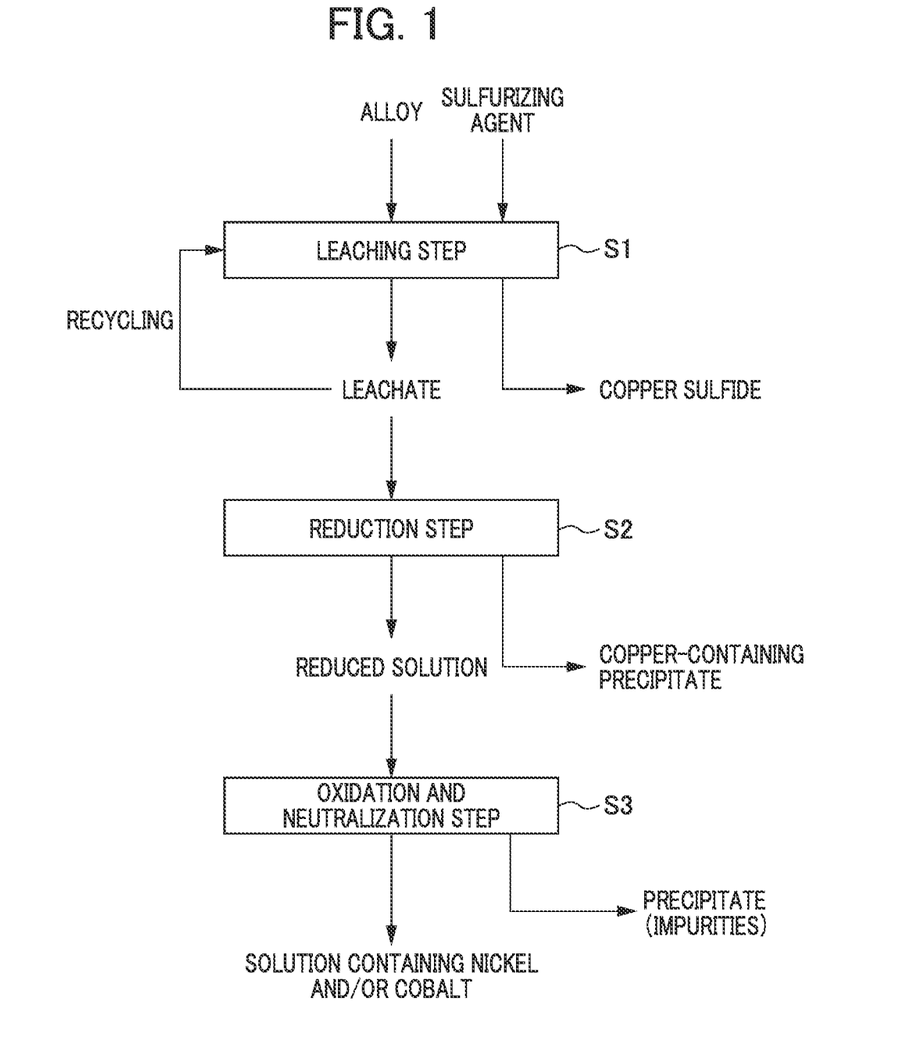
FIG. 1 is a flow chart showing the process flow of an example of an alloy processing method.

FIG. 1 is a flow chart showing the process flow of an example of the alloy processing method according to an embodiment. The method shown in FIG. 1 includes a leaching step S1 that includes subjecting an alloy including nickel and/or cobalt and copper to a leaching treatment with an acid solution in the presence of sulfur to obtain a leachate and a leached residue; a reduction step S2 that includes subjecting the resulting leachate to a reduction treatment by adding a reducing agent to the leachate to obtain a post-reduction solution and a reduced residue; and an oxidation and neutralization step S3 that includes subjecting the resulting reduced solution to an oxidation and neutralization treatment by adding an oxidizing agent and a neutralizing agent to the reduced solution to obtain a post-oxidation-and-neutralization solution and an oxidized and neutralized residue.

Leaching Step (1) Leaching Treatment

The leaching step S1 includes subjecting an alloy including nickel and/or cobalt and copper to a leaching treatment with an acid. This step may include adding a sulfurizing agent before or simultaneously with bringing the alloy into contact with the acid and may include performing the leaching treatment under conditions in the presence of the sulfurizing agent. The leaching treatment described above produces a leachate, which contains dissolved nickel and/or dissolved cobalt, and a leached residue, which contains copper sulfide as a main component.

In the leaching step S1, reactions (1) to (5) shown below can occur during the leaching treatment. The equations below show a case where the sulfurizing agent and the acid are solid sulfur (S) and sulfuric acid, respectively.

$$Cu + S \rightarrow CuS \qquad (1)$$

$$Ni + H_2SO_4 + 1/2 O_2 \rightarrow NiSO_4 + H_2O \qquad (2)$$

$$Co + H_2SO_4 + 1/2 O_2 \rightarrow CoSO_4 + H_2O \qquad (3)$$

$$H_2S + 1/2 O_2 \rightarrow S + H_2O \qquad (4)$$

$$CuS + 2 O_2 \rightarrow CuSO_4 \qquad (5)$$

Specifically, in the leaching step S1, the alloy is subjected to the leaching treatment with the acid in the presence of the sulfurizing agent, so that copper is leached from the alloy and allowed to react with the sulfurizing agent to form copper sulfide as a precipitate (Reaction Equation (1)). The copper sulfide precipitate is recovered as a leached residue. On the other hand, the leaching treatment with the acid allows nickel and/or cobalt (a component of the alloy) to be leached into the solution, so that a leachate containing nickel and/or cobalt in the form of ions is produced (Reaction Equations (2) and (3)). In this way, copper and nickel and/or cobalt can be separated from the alloy.

The leached nickel and/or cobalt may react with the sulfurizing agent to form a sulfide. Even in such a case, the presence of the acid solution allows decomposition of the sulfide, which allows nickel and cobalt to remain as ions in the leachate. The leachate may also contain some of the copper remaining unreacted with the sulfurizing agent. Such a copper residue remaining in the leachate can be effectively and efficiently separated and removed in the reduction step S2 described later.

The alloy obtained through the melting of discarded lithium ion batteries, which is to be processed, may be provided in any suitable shape, such as a plate-shaped cast alloy or a rod-shaped alloy obtained by appropriately cutting a drawn wire. In particular, the alloy to be processed is preferably in the form of a powder (powdery material). Such a powder will more effectively and efficiently undergo the leaching treatment.

When the alloy is in the form of a powder, the alloy powder preferably has a particle size of approximately 300 µm or less, so that it can more effectively undergo the leaching treatment. On the other hand, if the particle size is too small, the process for forming fine particles may be costly and may cause dust emission or ignition. Thus, the alloy powder preferably has a particle size of approximately 10 µm or more.

Before being subjected to the leaching treatment, the alloy to be processed is preferably subjected to preliminary washing with a diluted acid. This makes the surface of the alloy more active for the treatment and makes possible an accelerated leaching reaction.

In the method according to an embodiment, the reduction step S2 (described later) includes subjecting, to a reduction treatment, some of the leachate resulting from the leaching treatment. Subsequently, the remainder of the leachate, which is not subjected to the reduction treatment, is recyclably used as a part or the whole of the acid solution for the leaching of nickel and/or cobalt from the alloy in the leaching treatment of the leaching step S1. The term "recyclably use" means that as shown in the flow chart of FIG. 1, some of the leachate resulting from the treatment in the leaching step S1 is returned to and reused in the leaching step S1.

In this way, some of the leachate not subjected to the reduction treatment is recyclably used as an acid solution for the leaching treatment to serve as a reaction starting solution for the leaching reactions. The recyclable use can save the consumption of the acid solution (including a fresh acid solution), which may otherwise be in an excessive amount, and save the amount of the neutralizing agent used to neutralize the acid. This provides a simple process for efficiently leaching nickel and/or cobalt.

In the leaching treatment, the acid solution is added to allow nickel and/or cobalt to be leached from the alloy and to form a salt, while some of the acid should exist as a free acid (e.g., a free sulfuric acid in a case where a sulfuric acid solution is used) in an allowable (sufficient) amount so that it can provide a driving force for rapid progress of the leaching reactions. Thus, the acid solution should be added in an amount of more than 1 equivalent and 1.2 equivalents or less.

In this regard, the leachate is recyclably used as the acid solution for the leaching of the alloy, and thus the free acid contained in the leachate is also recyclably used. Therefore, the acid solution necessary for the second and subsequent leaching of the alloy may be added in an amount corresponding to 1 equivalent based on the total amount of nickel and/or cobalt in the alloy.

In the leaching treatment, increasing the amount of addition of the acid solution to increase the free acid concentration can increase the rate of the leaching reactions. However, using an acid solution with an excessively high concentration is undesirable because it is likely to generate hydrogen gas and hydrogen sulfide gas. Specifically, therefore, the amount of the leachate being recyclably used for the leaching treatment is preferably controlled such that the leaching treatment in the leaching step S1 produces a leachate with a free acid concentration of 0.4 mol/L or less, and more preferably controlled such that the leaching treatment in the leaching step S1 produces a leachate with a free acid concentration of 0.15 mol/L or more and 0.3 mol/L or less.

For the recyclable use of the leachate, the amount of the acid solution subjected to the leaching treatment is preferably more than 1 equivalent and 1.2 equivalents or less, and the amount of the leachate being recyclably used is preferably controlled such that the leaching treatment produces a leachate with a free acid concentration of 0.1 mol/L or more and 0.4 mol/L or less. This prevents the use of an excessive amount of the acid while allowing the leaching reactions to proceed, and allows the leaching treatment to be carried out more efficiently.

The acid solution used for the leaching treatment may consist of the leachate resulting from the treatment and being recyclably used. In other words, the leachate may be used as the whole of the acid solution. Alternatively, the leachate being recyclably used may make up a part of the acid solution being used. In such a case where the leachate is used as a part of the acid solution, the remaining part of the acid solution may include any suitable acid known in the art.

For example, a mineral acid, such as hydrochloric acid, sulfuric acid, or nitric acid may be mixed and used with the leachate being recyclably used. An acid solution prepared, for example, by adding a chloride to sulfuric acid may also be used. Particularly in a case where the alloy to be processed is derived from discarded lithium ion batteries, the acid to be used preferably includes sulfuric acid so that what is called "battery-to-battery" recycling can be achieved, which is an ideal recycling process that includes recycling discarded lithium ion batteries as raw materials for new lithium ion batteries. When the acid is sulfuric acid, the resulting leachate will contain a sulfate, which is easy to use as a positive electrode material for lithium ion batteries.

The leaching treatment may include supplying the alloy and the acid solution including the leachate to an apparatus having multiple mixing stages connected to one another, such as a thickener; and bringing the alloy and the acid solution gradually into contact with each other in countercurrent flow in the apparatus. For example, the alloy and the acid solution may be supplied respectively to the top and bottom mixing stages of the apparatus, and brought gradually into contact with each other in countercurrent flow.

The sulfurizing agent, which is added together with the acid solution, may be sodium hydrosulfide or elemental sulfur. In a case where elemental sulfur is used, it is preferably pulverized into a particle size suitable for acceleration of the reaction.

The amount (coexisting amount) of the sulfurizing agent added is preferably 1 equivalent or more based on the amount of copper in the alloy. The amount of the sulfurizing agent added is preferably 1.5 equivalents or less, more preferably 1.25 equivalents or less, based on the amount of copper in the alloy. Too much addition of the sulfurizing agent may increase the production of the residue rather than contribute to the acceleration of the reactions and thus increase the labor of handling the residue and increase the risk of generation of hydrogen sulfide gas.

For the leaching treatment, preliminary experiments are preferably performed to determine suitable ranges of treatment conditions, such as the temperature and time of the leaching treatment and the concentration of the slurry to be obtained by adding the acid solution and the sulfurizing agent to the alloy. In the leaching treatment, the solution may be bubbled with air or other means to ensure that the reactions proceed uniformly. The leaching treatment may also include adding divalent copper ions. In this case, the divalent copper ions will act as a catalyst to accelerate the leaching reactions.

Moreover, the leaching treatment preferably includes measuring the oxidation-reduction potential (ORP) and pH of the resulting leachate and controlling the ORP and pH.

The ORP value is preferably controlled to fall within the range of 240 mV or more and 300 mV or less as measured with reference to a silver-silver chloride electrode. A specific method of controlling the ORP includes, for example, adding an oxidizing agent. The oxidizing agent may be oxygen, air, hydrogen peroxide, ozone gas, or any other conventionally known one. For example, when the oxidizing agent is gaseous (or in a gas state), it may be bubbled into the solution while its supply (its feed rate) is adjusted, so that the ORP of the leachate will be controlled. Specifically, when the ORP of the leachate is at too high a level in the leaching treatment, the feed of the oxidizing agent may be reduced or stopped so that the ORP will decrease. Conversely, when the ORP has decreased to near the lower limit, the feed of the oxidizing agent may be increased so that the ORP will increase.

In the leaching treatment, controlling the ORP in such a manner, for example, within the range shown above will accelerate the leaching of nickel and/or cobalt. The control of the ORP can also prevent re-dissolution of the precipitated copper sulfide, which would otherwise be caused by excessive oxidation, so that nickel and/or cobalt and copper can be more effectively separated. Preferably, the ORP of the resulting leachate should be maintained in the range of 240 mV or more and 300 mV or less until the leachate and copper sulfide are separated from each other. This can prevent the oxidation of the precipitated copper sulfide and the re-leaching of copper.

It should be noted that the method for controlling the ORP and the setting range shown above are for optimal control and effective prevention of the oxidation of copper sulfide precipitated by the leaching reaction in a case where the whole amount of the leachate is subjected to the reduction treatment in the next reduction step S2. In the method according to an embodiment, a part or the whole of the leachate resulting from the leaching treatment is recycled for the leaching treatment, and thus slight oxidative leaching of copper sulfide (Reaction Equation (5) shown above) will be not a problem. This is because recycling the leachate for the leaching treatment allows copper, which has a lower ionization tendency than nickel, to undergo reduction to metallic copper according to Reaction Equation (6) below.

$$CuSO_4 + Ni \rightarrow Cu + NiSO_4 \quad (6)$$

At what point the leaching reactions should be ended may be determined through measuring the ORP of the leachate. For example, the point at which a reduction in the ORP value of the leachate is no longer observed when no alloy is newly charged into the reaction vessel may be determined to be the end point of the leaching reaction of nickel and/or cobalt. Alternatively, the point at which the monitored ORP value falls below 240 mV may be determined to be the end point of the leaching treatment in the management of the process because even the leached nickel and/or cobalt may also undergo a sulfurization reaction at an ORP of less than 240 mV.

The leaching treatment is preferably performed such that the pH of the resulting leachate falls within the range of 0.8 or more and 1.6 or less. In the leaching treatment, controlling the pH within such a range can accelerate the leaching and effectively prevent excessive oxidation and re-dissolution of the precipitated copper sulfide.

(2) Two-Stage Leaching

Figure 2:
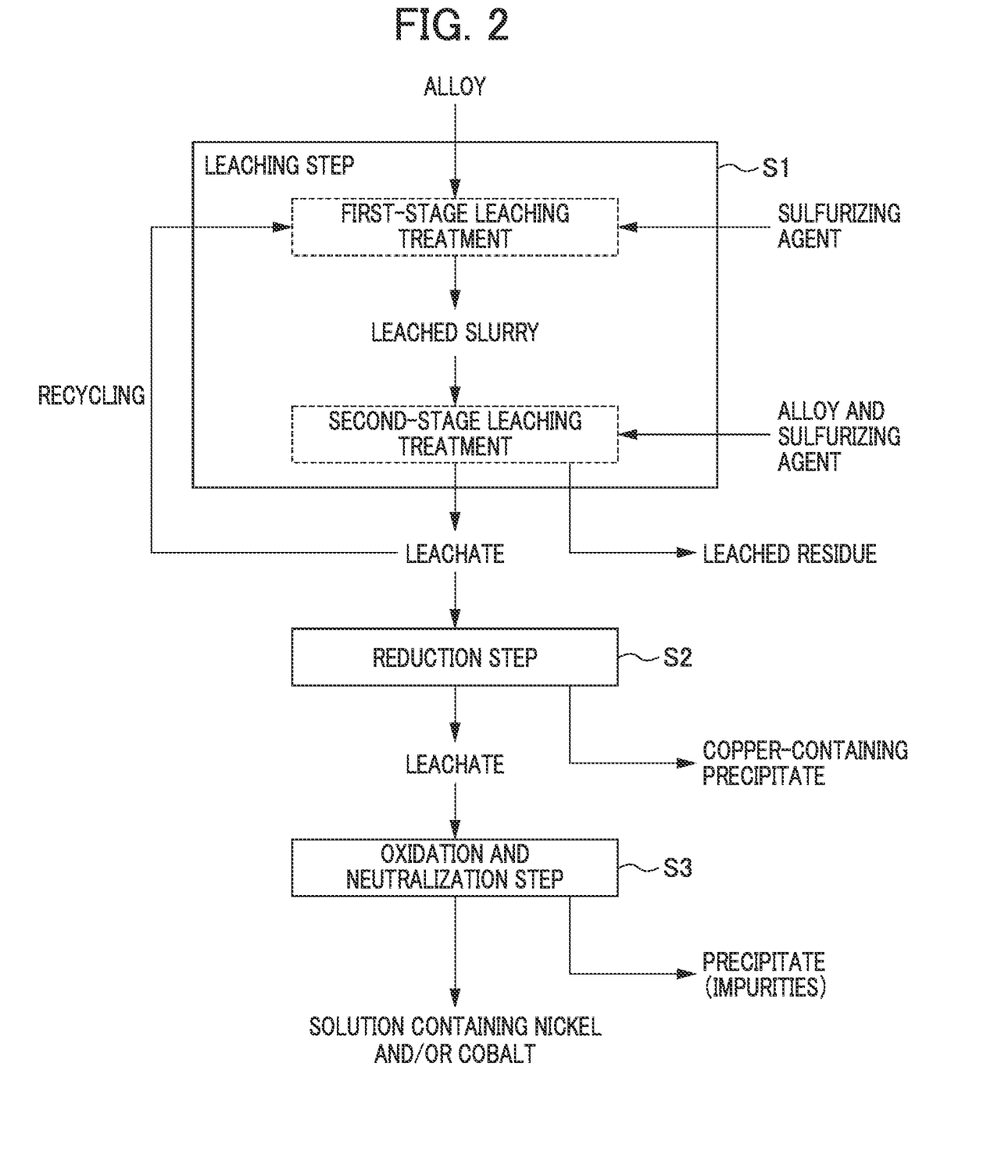
FIG. 2 is a flow chart showing the process flow of another example of an alloy processing method.

FIG. 2 is a flow chart showing the process flow of another example of an alloy processing method. As shown in FIG. 2, the leaching step S1 includes subjecting an alloy including nickel and/or cobalt and copper to two stages of leaching treatment. A first-stage leaching treatment produces a leached slurry including a leachate and a leached residue. The resulting leached slurry is directly subjected to a second-stage leaching treatment without undergoing solid-liquid separation.

More specifically, the leaching step S1 includes subjecting the alloy to a leaching treatment by adding an acid (first addition of an acid) in the presence of a sulfurizing agent to obtain a slurry including a leachate and a leached residue; subsequently further adding the alloy and the sulfurizing agent to the resulting slurry without using solid-liquid separation or any other means; and then subjecting the mixture to a leaching treatment again by adding an acid (second addition of an acid) to the mixture.

This two-stage leaching treatment allows more effective separation between copper and nickel and/or cobalt and efficient production of a solution containing nickel and/or cobalt at a high concentration.

First-Stage Leaching

Specifically, the first-stage leaching treatment includes adding an acid (acid solution) in the presence of a sulfurizing agent to the alloy to be processed to obtain a first leached slurry including at least: a solution containing nickel and/or cobalt leached from the alloy; and copper sulfide resulting from the reaction of the sulfurizing agent with copper leached from the alloy.

In the method according to an embodiment described above, the next reduction step S2 includes subjecting, to a reduction treatment, some of the leachate resulting from the leaching treatment, and the leaching treatment of the leaching step S1 includes recyclably using the remainder of the leachate, which is not subjected to the reduction treatment, as a part or the whole of the acid solution for the leaching of nickel and/or cobalt from the alloy. In this regard, when the leaching step S1 includes the two-stage leaching treatment, the second-stage leaching treatment is performed to produce a second leached slurry, which is then subjected to solid-liquid separation to produce a leachate, and a part or the whole of the resulting leachate is recyclably used.

Also for the two-stage leaching treatment, preliminary experiments are preferably performed to determine suitable ranges of treatment conditions, such as the temperature and time of the leaching treatment and the concentration of the slurry to be obtained. In the leaching treatment, the solution may be bubbled with air or other means to ensure that the reactions proceed uniformly. The leaching treatment may also include adding divalent copper ions. In this case, the divalent copper ions will act as a catalyst to accelerate the leaching reactions.

As mentioned above, the leaching treatment also preferably includes measuring the oxidation-reduction potential (ORP) of the resulting leachate and controlling the ORP value within the range of 240 mV or more and 300 mV or less as measured with reference to a silver-silver chloride electrode. At what point the first-stage leaching treatment should be ended may also be managed through measuring the ORP of the leachate. For example, the point at which the monitored ORP value falls below 240 mV may be determined to be the end point of the leaching treatment (the end point of the first-stage leaching treatment) in the manage- ment of the process because even the leached nickel and/or cobalt may also undergo a sulfurization reaction at an ORP of less than 240 mV. Alternatively, the point at which a reduction in the ORP value is no longer observed when no alloy is newly charged into the reaction vessel may be determined to be the end point of the leaching reaction of nickel and/or cobalt.

Second-Stage Leaching

Subsequently, the alloy and the sulfurizing agent are further added to the slurry including the leachate and the leached residue resulting from the first-stage leaching treatment, namely the first leached slurry including at least: a solution (leachate) containing nickel and/or cobalt leached from the alloy; and copper sulfide (leached residue) resulting from the reaction of the sulfurizing agent with copper leached from the alloy. The slurry is directly used without being subjected to any process, such as solid-liquid separation. Subsequently, the resulting mixture is subjected to a second-stage leaching treatment by adding an acid solution (second addition of an acid) to the mixture. In this way, the first leached slurry is subjected to the second-stage leaching treatment to produce a second leached slurry including a leachate and a leached residue.

As mentioned above, the reactions represented by Reaction Equation (1) to (3) occur during the leaching treatment. Specifically, nickel and/or cobalt (a component of the alloy) is leached into the solution so that a leachate containing nickel and/or cobalt in the form of ions is obtained (Reaction Equations (2) and (3)), and copper is leached from the alloy and allowed to react with the sulfurizing agent to form a copper sulfide precipitate (Reaction Equation (1)). This allows efficient separation of copper and nickel and/or cobalt from the alloy. During the leaching treatment, however, the copper sulfide precipitate may gradually oxidize so that copper may undergo re-leaching into the solution (leachate) as shown in Reaction Equation (5) above ($CuS + 2O_2 \rightarrow CuSO_4$). The sulfurizing agent may also oxidize under the air atmosphere, which contains oxygen, and turn into a sulfate, which no longer acts as a sulfurizing agent.

In this regard, when the leaching step S1 includes the two-stage leaching treatment, the second-stage leaching treatment is performed using, as a treatment starting liquid, the first leached slurry including the leachate resulting from the first-stage leaching treatment, and such a treatment starting solution contains nickel leached from the alloy. Thus, even if the copper sulfide precipitate gradually oxidizes, the resulting copper, which has a lower ionization tendency than nickel, will undergo a cementation (replacement) reaction as shown in Reaction Equation (6) below, thereby being reduced to metallic copper ($Cu^0$). Along with this reaction, the leaching of nickel and/or cobalt will further progress.

$$CuSO_4 + Ni \rightarrow Cu^0 + NiSO_4 \quad (6)$$

As described above, even if the copper sulfide precipitate resulting from the leaching treatment undergoes re-leaching, the second-stage leaching treatment will produce the cementation reaction represented by Reaction Equation (6) to reduce the leached copper to metallic copper and distribute it into the leached residue. Thus, while the re-leaching of copper into the leachate is reduced, nickel and/or cobalt can be more effectively separated from copper. In the second-stage leaching treatment, the first leached slurry including the leachate and the leached residue (including CuS) is subjected to the treatment. Thus, also when the production of copper sulfate by the oxidation of copper sulfide according to Reaction Equation (5) above is aggressively accelerated in the first-stage leaching treatment, the produced copper sulfate can be reduced to metallic copper, which will be distributed into the leached residue, in the second-stage leaching treatment, and the leaching of nickel and/or cobalt is allowed to further proceed. This allows the production of a solution containing nickel and/or cobalt at a high concentration. Increasing the production of copper sulfate leads to a reduction in the amount of sulfuric acid required for the leaching and thus is advantageous for cost reduction.

In the second-stage leaching treatment, the alloy added to the first leached slurry may be the same as the alloy to be processed, namely the alloy subjected to the first-stage leaching treatment. In this regard, the alloy added to the first leached slurry does not always have to have the same composition as that of the alloy subjected to the first-stage leaching treatment as long as it includes nickel and/or cobalt and copper.

The sulfurizing agent added to the first leached slurry may also be the same as that used for the first-stage leaching treatment. As in the first-stage leaching treatment, the amount (coexisting amount) of the sulfurizing agent added to the leached slurry may be, for example, in the range of 1 equivalent or more and approximately 1.5 equivalents or less based on the amount of copper in the alloy.

The acid solution used for the second-stage leaching treatment may also be the same as the acid solution used for the first-stage leaching treatment, such as a solution of a mineral acid, such as sulfuric acid, hydrochloric acid, or nitric acid, or a solution of any mixture of these mineral acids. As mentioned above, the second-stage leaching treatment is performed using the first leached slurry as a treatment starting liquid. The first leached slurry contains the leachate, which already contains the free acid derived from the acid solution added. Thus, the amount of the acid required for the second-stage leaching treatment may be basically 1 equivalent based on the total amount of nickel and/or cobalt in the alloy further added to the leached slurry. Alternatively, a larger amount (more than 1 equivalent) of the acid may be added to increase the concentration of the free acid so that the reaction rate will increase.

The second-stage leaching treatment described above produces a second leached slurry including: a leachate containing leached nickel and/or cobalt; and a leached residue containing copper in the form of copper sulfide. The second leached slurry can be separated into the leachate and the leached residue by solid-liquid separation. As a result, nickel and/or cobalt and copper are effectively separated from the alloy. The solid-liquid separation may be performed by any suitable known method, such as a method using a filter press.

After the first-stage leaching treatment, the second-stage leaching treatment is continuously performed without solid-liquid separation. In this process, the sulfurizing agent can be prevented from undergoing oxidation. This process is also advantageous for saving the investment for facilities, such as a filter press for solid-liquid separation, and for saving labor for filtration. Moreover, this process is advantageous in saving treatment time and energy, since the second-stage leaching treatment is started following the first-stage leaching treatment.

Reduction Step

The reduction step S2 includes subjecting the leachate resulting from the leaching treatment of the leaching step S1 to a reduction treatment by adding a reducing agent to the leachate to obtain a reduced solution (post-reduction solution), which contains nickel and/or cobalt, and a reduced residue. In this step, some of the leachate resulting from the leaching treatment is subjected to the reduction treatment according to the method according to an embodiment. As mentioned above, the remaining part of the resulting leachate, in other words, the part of the leachate not subjected to the reduction treatment, is recyclably used as a part or the whole of the acid solution for the leaching treatment in the leaching step S1.

In the leaching treatment, copper is sometimes partially leached together with nickel and/or cobalt from the alloy and dissolved into the acid solution, and sometimes partially remains unreacted with the sulfurizing agent in the solution. For example, when the ORP of the resulting leachate is controlled to more than 300 mV during the leaching treatment, copper tends to be leached simultaneously with nickel and/or cobalt so that the leachate may contain a certain amount of copper, although the leaching rate of nickel and/or cobalt will be high. Similarly, when the pH of the leachate is controlled to less than 0.8 during the leaching treatment, copper tends to be leached simultaneously with nickel and/or cobalt so that the leachate may contain a certain amount of copper, although the leaching rate of nickel and/or cobalt will be high.

In the reduction step S2, therefore, such a small amount of copper remaining in the resulting leachate is reduced to form a copper-containing precipitate. The resulting reduced residue including the precipitate can be separated by solid-liquid separation, so that a reduced solution containing nickel and/or cobalt can be obtained, from which copper has been separated. Thus, copper is selectively separated while the leaching rate of nickel and/or cobalt is kept high.

The reducing agent is typically, but not limited to, a metal more base than copper. In particular, a metallic material including nickel and/or cobalt is preferably used and brought into contact with the leachate to reduce copper. More specifically, the metallic material including nickel and/or cobalt may be an alloy including nickel and/or cobalt and copper, which may be the same as the material to be processed by the method according to an embodiment, namely the material to be subjected to the leaching treatment of the leaching step S1. The reducing agent may be not only a single-component material but also a mixture composed of two or more components.

In the method according to an embodiment, which is to produce a solution containing nickel and/or cobalt, using as a reducing agent a metallic material including nickel and/or cobalt, which is a target to be recovered, is industrially advantageous because such a reducing agent does not need to be recovered by any additional later step. Moreover, of course, the metallic material including nickel and/or cobalt, used as the reducing agent, will oxidize and dissolve into the post-reduction solution to increase the amount of recovered nickel and/or cobalt.

Besides the metallic material, a sulfide may also be used as the reducing agent. The sulfide may be solid, liquid, or gas (gaseous). The reducing agent may also be a mixture of sulfur and a powder of the alloy, which is the target of the leaching treatment. When used as the reducing agent, sulfur may be added in an amount equivalent to the amount of copper in the liquid to be treated or the alloy powder.

The reducing agent may also be a powder of the alloy to be processed. In a case where the alloy powder itself, which is the same as the material to be subjected to the leaching treatment, is used as the reducing agent, it should include at least the equivalent amount of nickel and/or cobalt required for the reduction of copper in the leachate.

The reduction treatment is preferably performed under conditions controlled to produce a post-reduction solution with a pH of 1.6 or less, which is similar to that of the leachate. In the reduction treatment, the liquid temperature is preferably 50° C. or more, which is similar to that of the leaching treatment. As a guide, the point at which the ORP reaches 0 mV or less may be used as the end point at which the removal of copper is completed (reaction end point).

Oxidation and Neutralization Step

The method according to an embodiment may include an oxidation and neutralization step S3, which is not essential. The oxidation and neutralization step S3 includes subjecting the reduced solution resulting from the reduction step S2 to an oxidation and neutralization treatment by adding an oxidizing agent and a neutralizing agent to the reduced solution to obtain a post-oxidation-and-neutralization solution and an oxidized and neutralized residue.

The oxidation and neutralization treatment produces and separates precipitates of impurities, such as iron and phosphorus, from the reduced solution, so that a purified solution containing nickel and/or cobalt at a high concentration is obtained.

The oxidizing agent is preferably, but not limited to, hydrogen peroxide or hypochlorous acid. While the oxidizing agent is added, the oxidation-reduction potential (ORP) of the solution is preferably monitored and controlled within a specific range. Specifically, the oxidizing agent is preferably added to the solution such that the ORP of the solution is controlled, for example, within the range of 380 mV or more and 430 mV or less when a silver-silver chloride electrode is used as a reference electrode.

After the oxidizing agent is added to produce an oxidation reaction, the neutralizing agent may be added to control the pH of the solution preferably within the range of 3.8 or more and 4.5 or less. The neutralization treatment performed so as to control the pH within such a range will effectively precipitate impurities including at least iron and/or phosphorus.

The neutralizing agent is preferably, but not limited to, an alkali, such as sodium hydroxide or potassium hydroxide.

The oxidation and neutralization treatment may include adding the neutralizing agent to the reduced solution; and then adding the oxidizing agent to the mixture or may include adding the oxidizing agent and the neutralizing agent simultaneously to the reduced solution. In particular, the oxidation and neutralization treatment preferably includes adding the oxidizing agent to the reduced solution; and then adding the neutralizing agent to the mixture. For example, when the oxidizing agent is added to the reduced solution having an increased pH resulting from the addition of the neutralizing agent, iron, if included in the impurities, may fail to undergo a sufficient level of oxidation, so that production of $Fe(OH)_3$ precipitates (iron precipitates) may fail and that the separation of the impurities may be insufficient.

If trace impurities remain even after the oxidation and neutralization treatment, the oxidation and neutralization step S3 may be followed by a removal step using a known technique, such as solvent extraction or ion exchange method, to remove such impurities.

EXAMPLES

Hereinafter, the present invention will be described more specifically with reference to examples, which are not intended to limit the present invention at all.

Examples 1 to 4

Leaching Step

Discarded lithium ion batteries (discarded LIBs) were subjected to a pyrometallurgical process including: subjecting them to oxidative roasting to obtain a roasted product; adding a reducing agent to the roasted product; and subjecting the mixture to heat-melting to reduce the roasted product. An alloy powder with a particle size of less than 300 μm was obtained from the product resulting from the reductive melting. The resulting alloy powder was subjected to the treatment. Table 1 below shows the composition of the alloy powder (powdery material) analyzed with an inductively coupled plasma (ICP) analyzer. Two types of alloys with different compositions (alloys A and B) were prepared as shown above.

TABLE 1

| Alloy | Composition (% by mass) | | | |
|---|---|---|---|---|
| | Ni | Co | Cu | Fe |
| Alloy A | 24 | 12 | 62 | 1.5 |
| Alloy B | 50 | 3.8 | 45 | 1.2 |

Specifically, the alloys with the compositions shown in Table 1 were each subjected to repetition of leaching treatment under the conditions shown in Table 2 below. Specifically, pure water was placed in a 200 L reaction vessel with baffle plates, and the alloy powder and elemental sulfur (sulfurizing agent) in an amount of 1.25 equivalents (S mol/Cu mol) based on the amount of copper in the alloy powder were added to the reaction vessel. The mixture was heated to the set temperature while being stirred at a rate of 400 rpm. The oxidation-reduction potential (ORP, Ag—AgCl reference electrode) was controlled by air bubbling at a flow rate of 100 L/min. The leaching of the alloy powder and the control of pH were performed using sulfuric acid at a concentration of 70%.

The slurry resulting from the leaching treatment was subjected to solid-liquid separation using a filter press. The resulting filtrate (leachate) and leached residue were each analyzed for composition using an ICP analyzer.

The leachate resulting from the solid-liquid separation was returned to the reaction vessel and used as an acid solution (starting solution) for the second and subsequent leaching treatments. The leaching treatment was repeated such that the total concentration of nickel and cobalt in the leachate reached at least 100 g/L. The first leaching treatment was performed using 100 L of a sulfuric acid solution as the acid solution.

Table 3 below shows the pH (final solution pH) and ORP (final solution ORP) values of the leachates resulting from the leaching treatments and shows the concentration and leaching rate of each component.

TABLE 2

| | | Alloy powder used | Alloy amount (kg) | Sulfur amount (kg) | Acid solution | Set conditions | | |
|---|---|---|---|---|---|---|---|---|
| | | | | | | pH | ORP | Temperature |
| Example 1 | First | Alloy A | 10 | 4.0 | Sulfuric acid(100 L) | 1.0 | At least 250 mV | 60° C. |
| | Second | | | | First leachate | 0.85 | | |
| | Third | | | | Second leachate | 0.75 | | |
| | Fourth | | 5 | 2.0 | Third leachate | 0.65 | | |
| Example 2 | First | Alloy B | 10 | 2.8 | Sulfuric acid(100 L) | 1.0 | | |
| | Second | | | | First leachate | 0.75 | | |
| Example 3 | First | | | | Sulfuric acid(100 L) | 1.0 | | |
| | Second | | | | First leachate | 0.75 | | |
| Example 4 | First | | | | Sulfuric acid(100 L) | 1.0 | | |
| | Second | | | | First leachate | 0.75 | | |

TABLE 3

| | | Final solution pH (@60° C.) | Final solution ORP (mV) | Leachate free acid concentration (mol/L) | Leachate concentration (g/L) | | | | Leaching rate (%) | | | |
|---|---|---|---|---|---|---|---|---|---|---|---|---|
| | | | | | Ni | Co | Cu | Fe | Ni | Co | Cu | Fe |
| Example 1 | First | 1.00 | 250 | 0.21 | 22 | 11 | 0.7 | 1.4 | 92 | 91 | 0.4 | 93 |
| | Second | 0.83 | 250 | 0.26 | 45 | 23 | 1.7 | 3.0 | 96 | 96 | 0.3 | 98 |
| | Third | 0.73 | 253 | 0.33 | 63 | 32 | 0.9 | 4.2 | 94 | 96 | 0.0 | 98 |
| | Fourth | 0.61 | 271 | 0.35 | 71 | 36 | 1.8 | 4.7 | 93 | 95 | 0.1 | 98 |
| Example 2 | First | 0.96 | 303 | 0.25 | 46 | 3.9 | 7.0 | 1.3 | 93 | 93 | 11 | 98 |
| | Second | 0.73 | 307 | 0.23 | 118 | 9.6 | 6.0 | 3.1 | 98 | 98 | 0.0 | 99 |
| Example 3 | First | 0.98 | 308 | 0.18 | 10 | 3.9 | 8.4 | 1.3 | 97 | 97 | 15 | 99 |
| | Second | 0.75 | 311 | 0.20 | 103 | 7.9 | 9.6 | 2.6 | 99 | 99 | 2.5 | 99 |
| Example 4 | First | 0.95 | 258 | 0.15 | 14 | 4.3 | 1.4 | 1.7 | 100 | 100 | 3.1 | 99 |
| | Second | 0.78 | 257 | 0.19 | 107 | 8.3 | 3.1 | 2.7 | 99 | 99 | 3.2 | 100 |

The results in Table 3 indicate that the leaching treatments performed through recyclable use, as the acid solution, the leachate resulting from the leaching treatment allowed the total concentration of nickel and cobalt in the leachate to reach at least 100 g/L and that a solution containing nickel and cobalt at high concentrations was effectively obtained by a simple process.

Example 5 and Reference Example 1 (Studies on Two-Stage Leaching)

An alloy powder with a particle size of less than 300 μm was prepared by the same method as in Example 1. Table 4 below shows the composition of the powder of alloy C (powdery material) analyzed with an ICP analyzer.

TABLE 4

| Alloy | Composition (% by mass) | | | |
|---|---|---|---|---|
| | Ni | Co | Cu | Fe |
| Alloy C | 52 | 4 | 42 | 2 |

Next, the powder of alloy C with the composition shown in Table 4 was subjected to leaching with a sulfuric acid solution under the conditions shown in Table 5 below. In Example 5, a two-stage leaching treatment was performed.

Specifically, 100 L of pure water was placed in a 200 L reaction vessel with baffle plates, and 10 kg of the alloy C powder (hereinafter also referred to as "the alloy powder") and 2.5 kg of elemental sulfur (sulfurizing agent), which corresponds to 1.25 equivalents (S mol/Cu mol) based on the amount of copper in the alloy powder, were added to the reaction vessel. The mixture was heated to the set temperature while being stirred at a rate of 400 rpm.

The leaching of the alloy powder was performed using a solution of sulfuric acid at a concentration of 70%. The sulfuric acid solution was added in a total amount of 16.4 kg while the pH was controlled and maintained at 1.0 under conditions at 60° C.

The oxidation-reduction potential (ORP) value (reference electrode: silver-silver chloride electrode) was controlled by air bubbling at a flow rate of 100 L/min (standard rate). The reaction end point was determined when the ORP remained at least at 250 mV even after the stop of air bubbling.

After the first-stage leaching treatment was completed, the resulting leached slurry (first leached slurry) was directly used without solid-liquid separation. To the first leached slurry were further added 10 kg of the alloy powder and 2.5 kg of sulfur, and a solution of sulfuric acid at a concentration of 70% was added in a total amount of 14.1 kg thereto for the second-stage leaching treatment.

TABLE 5

| Example 5 [Leaching conditions] | Solid-liquid separation of leached slurry | Starting liquid | Added amount (kg) | | | Final leachate | | Heating-up time (min) | Reaction time (min) |
|---|---|---|---|---|---|---|---|---|---|
| | | | Alloy | Sulfur | Sulfuric acid | Temperature | ORP | | |
| First-stage leaching treatment | Absent | 100 L of pure water | 10.0 | 2.5 | 16.4 | 60.4 | 261 | 15 | 290 |
| Second-stage leaching treatment | Present | Leached slurry resulting from first-stage treatment | 10.0 | 2.5 | 14.1 | 59.7 | 285 | — | 345 |

After the second-stage leaching treatment was completed, the resulting leached slurry (second leached slurry) was separated, by solid-liquid separation using a filter press, into a filtrate (leachate) and a leached residue, which were collected and analyzed for composition using an ICP analyzer. Table 6 below shows the results of analysis of the leachate and the leached residue and the leaching rate of each component.

TABLE 6

| Example 5 [Leaching results] | Final solution amount (L) | Leachate concentration (g/L) | | | Leached residue amount (kg) | Leached residue composition (% by mass) | | | | Leaching rate (%) | | | |
|---|---|---|---|---|---|---|---|---|---|---|---|---|---|
| | | Ni | Co | Cu | | Ni | Co | Cu | S | Ni | Co | Cu | S |
| First-stage leaching treatment | 91 | 53 | 4.6 | 1.1 | — | | | | | — | | | |
| Second-stage leaching treatment | 99 | 99 | 8.6 | 3.9 | 12.8 | 1.2 | 0.11 | 63 | 36 | 98.6 | 98.5 | 4.3 | 7.8 |

The results in Table 6 indicate that a combination of the first-stage leaching treatment and the second-stage leaching treatment, in which the leached slurry resulting from the first-stage leaching treatment was directly used (as the starting liquid) without solid-liquid separation, successfully produced a solution (leachate) containing nickel and cobalt at high concentrations (at a total concentration of at least 100 g/L).

As for Example 5, the leaching treatment is considered easier to accelerate when the alloy and the sulfurizing agent (elemental sulfur) can more frequently contact with each other, since in the leaching treatment, metallic copper (a component of the alloy powder) is fixed as copper sulfide (see Reaction Equation (1) above) by being brought into contact with sulfur while nickel and cobalt are selectively leached with the acid.

In Example 5, the second-stage leaching treatment produces a larger amount of a copper sulfide-containing leached residue than the second-stage leaching treatment in Reference Example 1 shown below because the first leached slurry including the leachate and the leached residue (including copper sulfide) is subjected to the second-stage leaching treatment. It is therefore suggested that, in Example 5, the production of copper sulfate by oxidation (see Reaction Equation (5) above) should be accelerated, which should allow the leaching of nickel and cobalt to further proceed due to the cementation (replacement) reaction (see Reaction Equation (6) above) with nickel in the leachate, so that the reactions should be allowed to proceed even with a smaller amount of addition of sulfuric acid for the successful production of a solution containing nickel and cobalt at high concentrations.

Reference Example 1

The alloy powder with the composition shown in Table 4 above was used and subjected to leaching with a sulfuric acid solution under the conditions shown in Table 7 below.

In Reference Example 1, a two-stage leaching treatment was also performed. In Reference Example 1, the two-stage leaching treatment was performed as in Example 5 except that the leached slurry (first leached slurry) resulting from the first-stage leaching treatment was subjected to solid-liquid separation using a filtering machine and that only the separated and collected leachate was used as the treatment starting liquid for the second-stage leaching treatment, which was started by heating. Since the first leached slurry was subjected to solid-liquid separation, the first-stage leaching treatment also produced a leached residue.

TABLE 7

| Reference Example 1 [Leaching conditions] | Solid-liquid separation of leached slurry | Starting liquid | Added amount (kg) | | | | | Heating-up time (min) | Reaction time (min) |
|---|---|---|---|---|---|---|---|---|---|
| | | | Alloy | Sulfur | Sulfuric acid | Final leachate Temperature | ORP | | |
| First-stage leaching treatment | Present | 100 L of pure water | 10.0 | 2.5 | 17.6 | 59.6 | 281 | 15 | 310 |
| Second-stage leaching treatment | Present | Leachate resulting from first-stage treatment | 10.0 | 2.5 | 15.0 | 61.5 | 282 | 15 | 350 |

Table 8 below shows the results of analysis of the leachate and the leached residue and the leaching rate of each component.

TABLE 8

| Reference Example 1 [Leaching results] | Final solution amount (L) | Leachate concentration (g/L) | | | Leached residue amount (kg) | Leached residue composition (% by mass) | | | | Leaching rate (%) | | | |
|---|---|---|---|---|---|---|---|---|---|---|---|---|---|
| | | Ni | Co | Cu | | Ni | Co | Cu | S | Ni | Co | Cu | S |
| First stage leaching treatment | 91 | 56 | 4.8 | 2.6 | 5.5 | 1.0 | 0.11 | 73 | 36 | 98.8 | 98.2 | 7.2 | 21.2 |
| Second-stage leaching treatment | 99 | 104 | 9.1 | 2.4 | 6.4 | 0.52 | 0.05 | 67 | 33 | 99.2 | 99.0 | 0.0 | 17.7 |

The results in Table 8 indicate that the leaching rate of nickel and cobalt in Reference Example 1 is substantially the same as that in Example 5 and that there is no significant difference in reaction time between them. In Reference Example 1, however, the leaching rate of sulfur (in other words, the rate of oxidation of sulfur) was significantly higher, which resulted in a lower efficiency of the reaction of sulfur.

The invention claimed is:

1. An alloy processing method comprising:
   a leaching step that comprises subjecting an alloy comprising nickel and/or cobalt and copper to a leaching treatment with a sulfuric acid solution in the presence of a sulfurizing agent to obtain a leachate and a leached residue; and
   a reduction step that comprises subjecting a portion of the leachate to a reduction treatment by adding a reducing agent to the portion of the leachate to obtain a post-reduction solution and a reduced residue;
   wherein a remainder of the leachate, not subjected to the reduction treatment of the reduction step, is recycled for use in the leaching step as part or whole of the sulfuric acid solution added for the leaching treatment;
   wherein in the leaching step,
      an oxidative-reduction potential of the leachate is measured and controlled by addition of an oxidizing agent,
      the oxidative-reduction potential value of the leachate is controlled within the range of 240 mV or more and 300 mV or less as measured with reference to a silver-silver chloride electrode;
      the sulfuric acid solution is added in an amount of more than 1 equivalent and 1.2 equivalents or less based on the total amount of nickel and/or cobalt in the alloy for the leaching treatment; and
      the leaching treatment produces a leachate with a free acid concentration in a range of 0.1 mol/L or more and 0.4 mol/L or less.

2. The alloy processing method according to claim 1, wherein the leaching step comprises:
   performing the leaching treatment to obtain a first leached slurry comprising at least a sulfide of copper and a solution containing nickel and/or cobalt;
   then further adding the alloy and the sulfurizing agent to the first leached slurry and performing the leaching treatment again on a resulting mixture to obtain a second leached slurry comprising a leachate and a leached residue; and
   subjecting the second leached slurry to solid-liquid separation to obtain the leachate, and
   wherein the reduction step comprises subjecting the leachate to the reduction treatment.

3. The alloy processing method according to claim 2, wherein the alloy comprises an alloy obtained through melting discarded lithium ion batteries.

4. The alloy processing method according to claim 1, further comprising an oxidation and neutralization step that comprises subjecting the reduced solution resulting from the reduction step to an oxidation and neutralization treatment by adding an oxidizing agent and a neutralizing agent to the reduced solution to obtain a post-oxidation-and-neutralization solution and an oxidized and neutralized residue.

5. The alloy processing method according to claim 4, wherein the alloy comprises an alloy obtained through melting discarded lithium ion batteries.

6. The alloy processing method according to claim 1, wherein the alloy comprises an alloy obtained through melting discarded lithium ion batteries.

\* \* \* \* \*